United States Patent [19]

Clingman et al.

[11] Patent Number: 5,130,163
[45] Date of Patent: Jul. 14, 1992

[54] POROUS LAMINATE SURFACE COATING METHOD

[75] Inventors: David L. Clingman, Carmel, Ind.; Berton Schechter, Lantana, Fla.; John R. Cavanagh, Brownsburg, Ind.

[73] Assignee: General Motors Corporation, Detroit, Mich.

[21] Appl. No.: 692,091

[22] Filed: Apr. 26, 1991

[51] Int. Cl.⁵ .......................... B05D 3/02; B05D 3/12; B05D 5/00; B05D 1/08
[52] U.S. Cl. ............................. 427/57; 427/34; 427/226; 427/247; 427/259; 427/292; 427/336
[58] Field of Search ................. 407/34, 57, 243, 247, 407/282, 259, 272, 292, 226, 336

[56] References Cited

U.S. PATENT DOCUMENTS

| | | | |
|---|---|---|---|
| 2,564,497 | 8/1951 | Navias | 431/356 |
| 2,588,422 | 3/1952 | Shepard | 138/145 |
| 2,867,112 | 1/1959 | Krone | 52/676 |
| 3,584,972 | 6/1971 | Bratkovich et al. | 416/229 R |
| 3,663,270 | 5/1972 | Blair | 427/247 |
| 4,004,056 | 1/1977 | Carroll | 428/138 |
| 4,338,360 | 7/1982 | Cavanagh et al. | 427/247 |
| 4,743,462 | 5/1988 | Radzavich et al. | 427/282 X |

*Primary Examiner*—Evan Lawrence
*Attorney, Agent, or Firm*—Saul Schwartz

[57] ABSTRACT

A method of applying a thermal barrier coat on an exposed side of a porous metal laminate which method includes the steps of spreading on the laminate an air-curable maskant to force maskant into the perforations in the exposed side, removing excess maskant from the exposed side so that maskant plugs remain in the perforations with tops generally coplanar with the exposed side, allowing the maskant to cure, directing sprays of bond coat and top coat incompatible with the maskant at the exposed side of the porous laminate to deposit a thermal barrier coat thereon but not on the maskant plugs, and removing the maskant plugs by thermal and chemical treatment or by chemical treatment alone.

5 Claims, 2 Drawing Sheets

POROUS LAMINATE SURFACE COATING METHOD

FIELD OF THE INVENTION

This invention relates to methods of applying thermal barrier coatings to exposed surfaces of porous metal laminates.

BACKGROUND OF THE INVENTION

U.S. Pat. No. 3,584,972, issued Jun. 15, 1971 to Bratkovich et al and assigned to the assignee of this invention, describes a porous metal laminate suitable for application in high temperature environments of gas turbine engines. The porous metal laminate has a perforated exposed side facing the source of high temperature, a perforated shrouded side exposed to a source of coolant gas such as compressed air, and a plurality of tortuous internal passages between the perforations for conducting coolant from the shrouded side to the exposed side. U.S. Pat. No. 4,338,360, issued. Jul. 6, 1982 to Cavanagh et al and assigned to the asignee of this invention, describes a method of applying a thermal barrier coat to the exposed side of the porous metal laminate which method minimizes the effect on coolant flow through the laminate caused by barrier coat material deposited on surfaces of the laminate defining air flow paths therethrough. A method according to the present invention of applying a thermal barrier coat to an exposed side of a porous metal laminate further reduces deposits of thermal barrier coat material on surfaces of the laminate defining air flow paths through the laminate.

SUMMARY OF THE INVENTION

This invention is a new and improved method of applying a thermal barrier coat on an exposed side of a porous metal laminate having a plurality of exposed side perforations through which coolant is discharged. In the method according to this invention, a viscous spreadable maskant is spread over the exposed side and into exposed side perforations. While the maskant remains spreadable, the exposed side is wiped clean, leaving plugs of maskant in the exposed side perforations in the plane of the exposed side of the laminate. The plugs are allowed to cure at ambient temperature to an elastomeric consistency in which they adhere to and seal each of the exposed side perforations. Then, the exposed side is mechanically cleaned and roughened and a thermal barrier coat is applied by plasma spray deposition of a bond coat and a ceramic top coat. Following application of the barrier coat, the maskant plugs are removed from the porous metal laminate by thermal degradation and liquid flush or by chemical dissolution without thermal degradation, or by a combination of the two methods.

DESCRIPTION OF A PREFERRED EMBODIMENT

Figure 1:
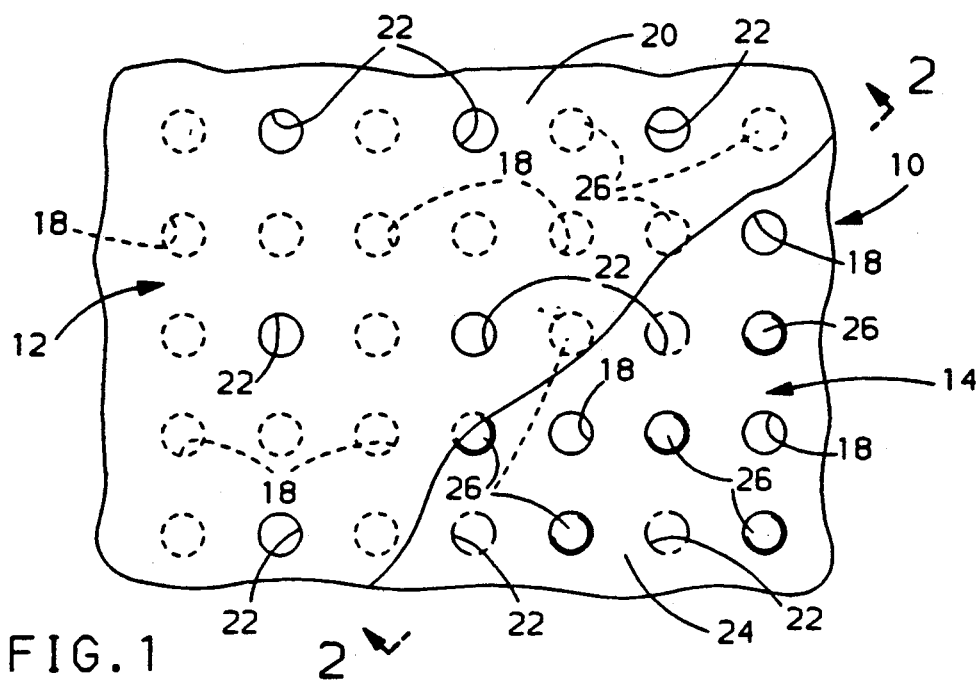
FIG. 1 is a partially broken-away planar view of a representative or generic porous metal laminate.
Figure 2:
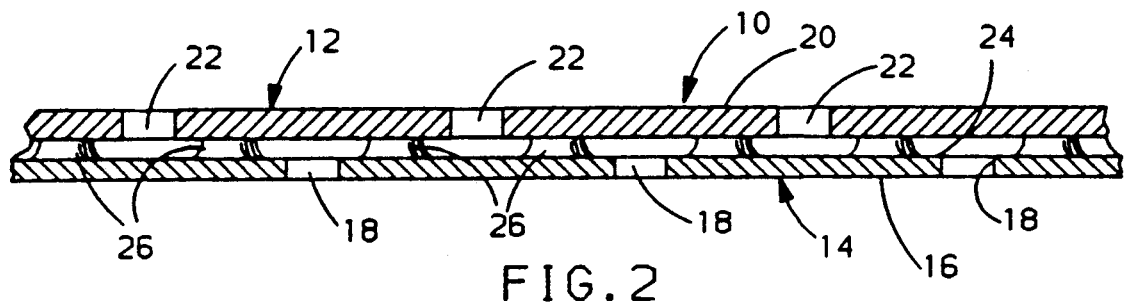
FIG. 2 is a sectional view taken generally along the plane indicated by lines 2—2 in FIG. 1.

Referring to FIGS. 1-2, a representative or generic bare porous metal laminate (10) includes a first or inside lamina (12) and a second or outside lamina (14). The designations inside and outside are relative to a source of high temperature such as combustion in a gas turbine engine combustor. Accordingly, the inside lamina (12) is closer to the source of high temperature than the outside lamina (14). The outside lamina has a shrouded side (16) facing a source of coolant such as compressed air and a plurality of shrouded side perforations or pores (18) opening through the shrouded side (16). The shrouded side perforations (18) may have diameters of on the order of 0.020–0.040 inch. The inside lamina (12) has an exposed side (20) facing the source of high temperature and a plurality of exposed side perforations or pores (22) opening through the exposed side. The exposed side perforations (22) may have diameters of on the order of 0.010–0.040 inch.

The side of the outside lamina (14) opposite the shrouded side (16) is chemically machined to define an etched surface (24) facing the inside lamina (12) and a plurality of dimples (26) which are raised relative to the etched surface (24). The inside and outside lamina are diffusion bonded or brazed at the raised dimples and together define a unitary, rigid laminate. In addition, the shrouded side perforations (18) are offset relative to the exposed side perforations (22) so that coolant flow from the shrouded side perforations to the exposed side perforations is forced to follow tortuous flow paths around the dimples (26). The aforesaid U.S. Pat. No. 3,584,972, and U.S. Pat. 4,004,056, issued Jan. 18, 1977 and assigned to the assignee of this invention, describe additional, representative porous metal laminates.

To enhance or improve the thermal resistance of the laminate (10), a thermal barrier coat is applied to the exposed side (20) of the laminate by a method according to this invention including the following process steps.

Figure 3:
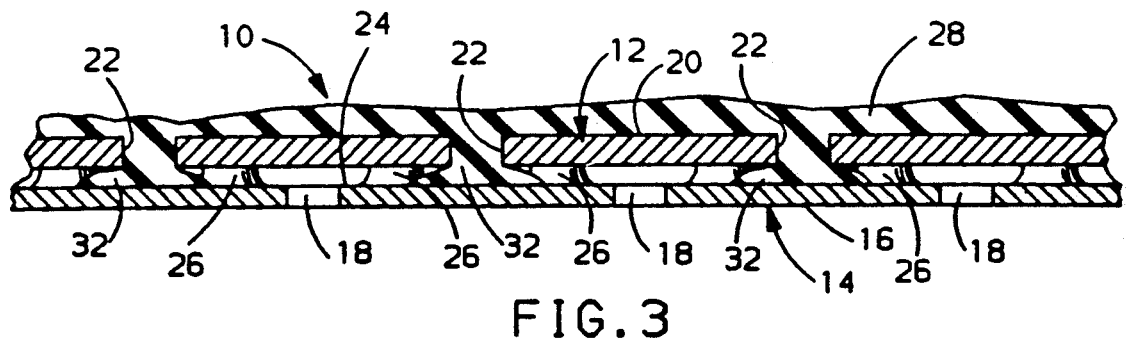
FIG. 3 is a view similar to FIG. 2 and showing the porous metal laminate after application of spreadable maskant.

(A) Commencing with a clean laminate (10), e.g. a laminate which has been conventionally degreased and/or ultrasonically cleaned in acetone, a viscous spreadable maskant (28) is liberally applied to the exposed side (20), FIG. 3. In a successful demonstration of the method according to this invention, a modified two-part, air-cured silicone rubber based sealant available under the trade name RTV-11 from General Electric Company was troweled onto the exposed side (20) to a depth of about 0.020 inch. The maskant was mixed with pure graphite to modify the viscosity of the maskant which, after troweling, penetrated into the internal passages through each of the exposed side perforations (22). A hardening agent may also be mixed with the maskant.

Figure 4:
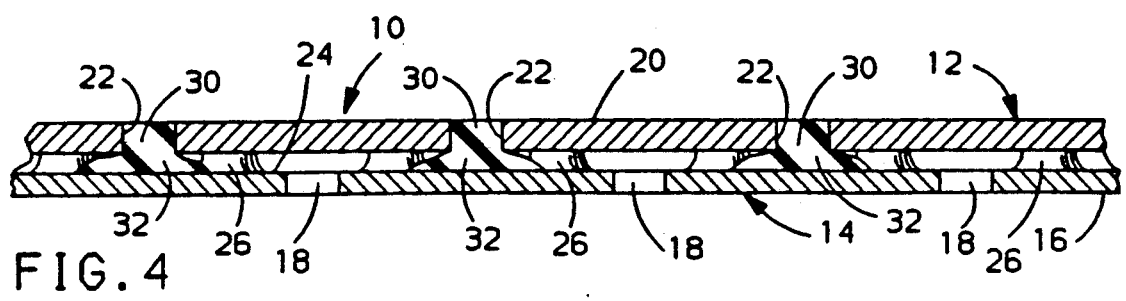
FIG. 4 is a view similar to FIG. 2 and showing maskant plugs in exposed side perforation of the porous metal laminate.

(B) While the maskant remains spreadable, i.e. uncured, an excess quantity thereof is wiped or squeegeed from the exposed side (20). Maskant remaining on the laminate (10), then, defines a plurality of maskant plugs (30) in the exposed side perforations (22) the tops of which in the perforations are coplanar or substantially coplanar with the plane of the exposed side (20), FIGS. 4 and 7. A plurality of deposits (32) of surplus maskant are captured in the internal passages of the laminate behind the plugs (30).

(C) The maskant plugs (30) and the surplus maskant below the plugs is allowed to cure at ambient temperature. In the aforesaid experimental demonstration, the maskant was allowed to cure overnight to an elastomeric or rubber-like consistency. The cured maskant plugs adhere to the circumferences of the corresponding ones of the exposed side perforations (22) and, accordingly, effectively seal each of the exposed side perforations.

(D) The exposed side (20) is mechanically cleaned and roughened, e.g. grit blasted, to assure uniform adhesion of the thermal barrier coat applied in subsequent steps. The elastomeric consistency of the cured maskant plugs (30) is believed to cause cleaning grit striking the plugs to rebound or bounce off of the plugs without significantly damaging or dislodging the plugs from the exposed side perforations (22). Of course, if any minor dislodgment is detected, spreadable maskant is simply reapplied to the effected plugs and allowed to cure.

Figure 5:
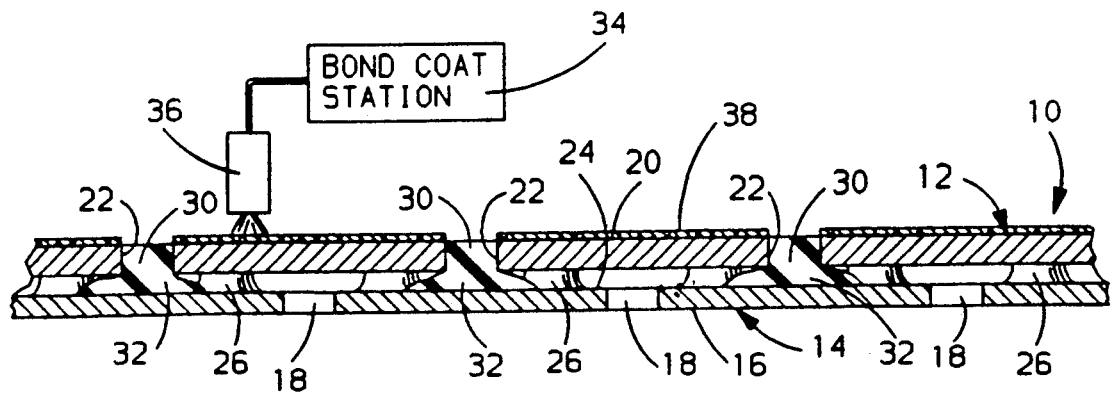
FIG. 5 is a view similar to FIG. 4 and showing the porous metal laminate after application of a thermal barrier bond coat layer.

(E) At a bond coat station (34), FIG. 5, a plasma spray nozzle (36) directs a thermal spray of bond coat at the exposed side (20) of the laminate (10). A representative bond coat spray used in the aforesaid experimental demonstration is AMDRY 963 (NiCrAlY) Alloy available from Sulzer-Plasma Technik. The bond coat spray is applied to a thickness of about 0.005 inch to define a bond coat layer (38), FIGS. 5 and 7, on the exposed surface (20).

Because the plugs (30) in the exposed side perforations (22) are in the plane of the exposed side (20), the plugs do not shadow the area around the exposed side perforations. Accordingly, there is no restriction on the direction from which the bond coat is sprayed on the exposed side. In the aforesaid experimental demonstration, the bond coat was sprayed perpendicular to the exposed side (20). In addition, the bond coat does not readily adhere to the plugs (30) and it is believed that incompatibility, along with the velocity of the bond coat particles impacting the plugs, contributes to rebound of almost all impacting particles from the plugs without adhesion to the latter.

Figure 6:
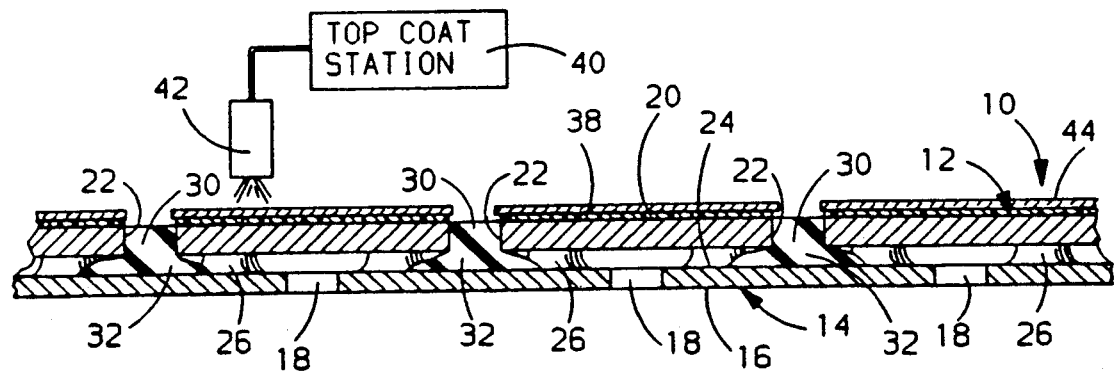
FIG. 6 is a view similar to FIG. 5 and showing the porous metal laminate after application of a thermal barrier ceramic top coat layer.

(F) At a top coat station (40), FIG. 6, a plasma spray nozzle (42) directs a thermal spray of top coat at the exposed side (20) of the laminate (10). A representative top coat spray used in the aforesaid experimental demonstration is 8 w/O Yttria-stabilized Zircoa available from Zircoa Div., Didier Werke. The top coat spray is applied to a thickness of about 0.010 inch to define a top coat layer (44), FIGS. 6 and 7, on the bond coat layer (38) on the exposed side (20).

As described above, the plugs (30) do not shadow the area around the exposed side perforations and, therefore, do not restrict the direction from which the top coat is sprayed on the bond coat layer (38). In the aforesaid experimental demonstration, the top coat was sprayed perpendicular to the exposed side (20). In addition, the top coat does not readily adhere to the plugs (30) and it is believed that incompatibility, along with the velocity of the top coat particles impacting on the plugs, contributes to rebound of almost all impacting top coat particles from the plugs without adhesion to the latter.

Figure 7:
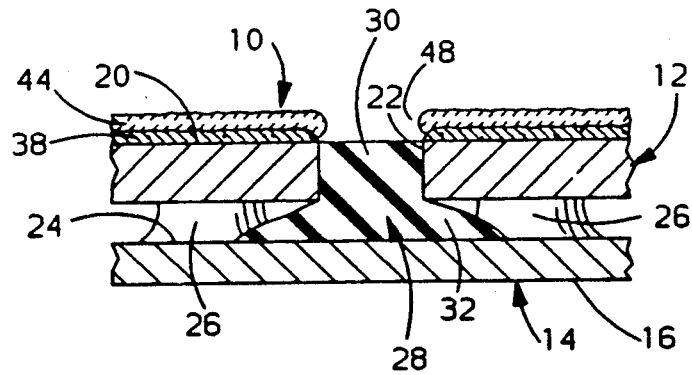
FIG. 7 is an enlarged view of a portion of FIG. 6.

It was noted in the aforesaid experimental demonstration that even though top coat and bond coat material does not adhere directly to the plugs (30), top coat may bridge some of the plugs from around the circumferences of the corresponding exposed side perforations. Referring to FIG. 7, for example, bond coat does not adhere to the plugs (30) and, therefore, does not encroach beyond the circumferences of the exposed side perforations (22). When the top coat is sprayed over the bond coat, however, top coat may accumulate as an inwardly projecting lip (48).

Because of the small diameters of the exposed side perforations (22), the lip (48) may occasionally completely shroud a plug (30) even though the top and bond coat layers (44)(38) are not adhered to the plug. Shrouded ones of the plugs (30) are easily identified by dimples in the top coat layer (44). In that circumstance, the succeeding step in the method according to this invention is facilitated by mechanically piercing the top coat layer (44) over the shrouded ones of the plugs (30).

(G) The plugs (30) and surplus maskant deposits (32) in the internal passages are removed from the laminate by thermal/chemical treatment or by chemical treatment alone. In the aforesaid experimental demonstration, the plugs and maskant were removed from four samples of thermal barrier coated laminate (10) by four different combinations of thermal/chemical treatments as follows.

(1) A first sample of laminate (10), having undergone steps (A–F) described above, was maintained at a temperature of 800° F. for 16 hours in a static oxidizing atmosphere. Thereafter, the laminate was immersed in an ultrasonic Acetone bath for two hours.

(2) A second sample of laminate (10), having undergone steps (A–F) described above, was maintained at a temperature of 1200° F. for 16 hours in a static oxidizing atmosphere. Thereafter, the laminate was immersed in an ultrasonic Acetone bath for two hours.

(3) A third sample of laminate (10), having undergone steps (A–F) described above, was maintained at a temperature of 1600° F. for 4 hours in a static oxidizing atmosphere. Thereafter, the laminate was immersed in an ultrasonic detergent bath of MICRO DETERGENT, commercially available from Cole-Parmer Instrument Co., for two hours.

(4) A fourth sample of laminate (10), having undergone steps (A–F) described above, was maintained at a temperature of 1600° F. for 4 hours in a static oxidizing atmosphere. Thereafter, the laminate was immersed in an ultrasonic detergent bath of MICRO DETERGENT, commercially available from Cole-Parmer Instrument Co., for 14 (fourteen) hours.

Figure 8:
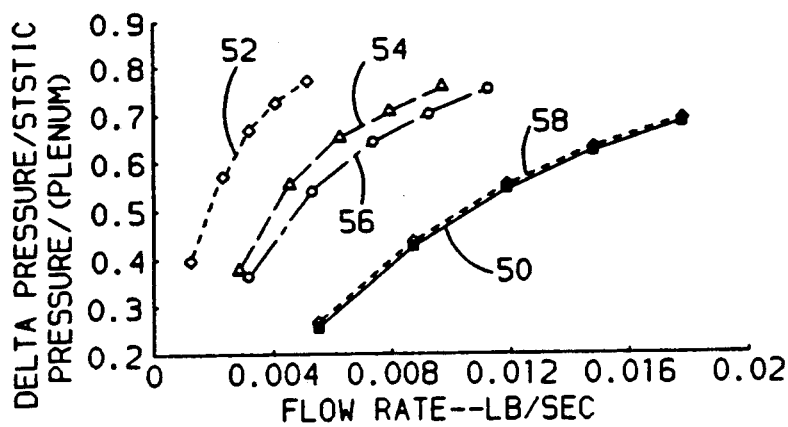
FIG. 8 is a graphical representation comparing air flow across porous metal laminates treated by the method according to this invention with air flow rates across a bare porous metal laminate.

As a quantative measure of the success of the method according to this invention, the air flow rates from the shrouded sides (16) to the exposed sides (20) of the four laminate samples described above were compared with the corresponding air flow rate of an uncoated or bare laminate. In FIG. 8, a curve (50) describes air flow across the bare laminate sample. A plurality of curves (52), (54), and (56) describe, respectively, air flow across laminate samples treated in accordance with steps (G)(1), (G)(2) and (G)(3) above. A curve (58), virtually coincident with curve (50), describes air flow across a laminate sample treated in accordance with step (G)(4) above. Curve (58) verifies that a thermal barrier coat may be applied by a method according to this invention to a porous metal laminate with virtually no negative impact on the air flow characteristic of the laminate.

In another experimental demonstration of the method according to this invention, a sample of laminate (10) coated with bond coat and barrier coat layers according to steps (A-F) described above had the maskant successfully chemically removed without thermal exposure. The coated sample was completely immersed in liquid DYNASOLVE 210 commercially available from Dynaloy, Incorporated, for 7 hours with continuous agitation by a magnetic stirrer. The sample was then rinsed in methanol, submerged in methanol for 1 hour with continuous agitation by a magnetic stirrer, removed from the methanol, blown dry with filtered air, and, finally, ultrasonically cleaned in acetone for 30 minutes.

We claim:

1. A method of coating an exposed surface of a porous metal laminate with a thermal barrier coat,
    said exposed surface of said porous metal laminate having a plurality of perforations therein through which are exposed a plurality of internal passages of said porous metal laminate,
    said method comprising the steps of:
    forming in each of said perforations in said exposed surface a plug of curable maskant having an elastomeric consistency after curing and a top surface substantially coplanar with said exposed surface,
    roughening said exposed surface,
    directing a spray of a bond coat incompatible with said maskant toward said roughened exposed surface to coat said roughened exposed surface with a bond coat layer,
    said bond coat spray impinging on said top surfaces of said maskant plugs and rebounding therefrom without adhesion thereto so that said top surfaces of said plugs are not coated with said bond coat layer,
    directing a spray of a ceramic top coat incompatible with said maskant toward said bond coat layer on said exposed surface to coat said bond coat layer with a thermally resistant ceramic top coat layer,
    said top coat spray impinging on said top surfaces of said maskant plugs and rebounding therefrom without adhesion thereto so that said top surfaces of said plugs are not coated with said top coat layer, and
    removing said maskant plugs from said porous laminate to unblock said passages therein and to unblock said perforations in said exposed surface.

2. The method recited in claim 1 wherein said curable maskant includes a two-part air-cured silicone rubber based sealant.

3. The method recited in claim 2 wherein the step of roughening said exposed surface consists of mechanically roughening said exposed surface.

4. The method recited in claim 2 wherein the step of forming in each of said perforations in said exposed surface a plug of curable maskant having an elastomeric consistency after curing and a top surface substantially coplanar with said exposed surface includes the steps of:
    troweling said maskant in an uncured condition onto said exposed surface to force said maskant into said perforations in said exposed surface,
    removing excess maskant from said exposed surface so that uncured maskant in said perforations extends outward only to substantially the plane of said exposed surface, and
    allowing said maskant to cure.

5. The method recited in claim 2 wherein the step of removing said maskant plugs from said porous laminate to unblock said passages therein and to unblock said perforations in said exposed surface includes the steps of:
    exposing said porous laminate to an elevated temperature of between about 800 and 1200 degrees F. in a static oxidizing atmosphere for between about 4 and 16 hours, and
    cleaning said laminate by immersion in an ultrasonic liquid cleaner bath for on the order of two to fourteen hours.

* * * * *